Figure 1:
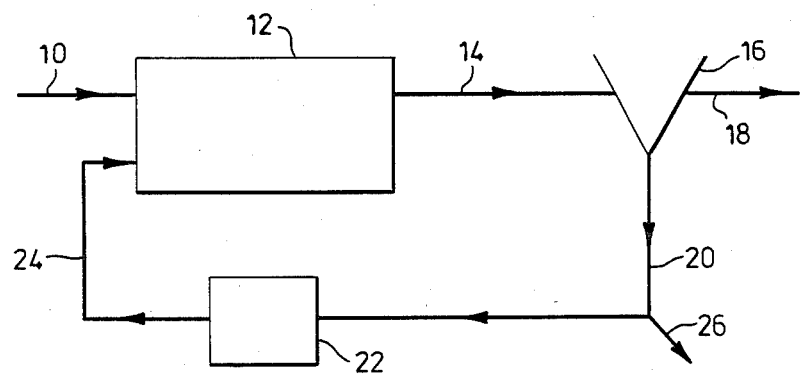

United States Patent [19]

Ganczarczyk et al.

[11] Patent Number: 4,720,344

[45] Date of Patent: Jan. 19, 1988

[54] NITRIFICATION PROCESS IN WASTE WATER TREATMENT

[76] Inventors: Jerzy J. Ganczarczyk, 83 Edenbridge Dr., Islington, Ontario, Canada, M9A 3G5; Sabaratnam Suthersan, Box 82, 321 Bloor St. West, Toronto, Ontario, Canada, M5S 1S5

[21] Appl. No.: 16,476

[22] Filed: Feb. 17, 1987

Related U.S. Application Data

[63] Continuation of Ser. No. 724,649, Apr. 18, 1985, abandoned.

[51] Int. Cl.$^4$ .............................................. C02F 3/34
[52] U.S. Cl. .................................... 210/612; 210/625; 210/631; 210/903
[58] Field of Search ............... 210/903, 609, 611, 614, 210/623, 624, 625, 626, 630, 631, 612

[56] References Cited

U.S. PATENT DOCUMENTS

| | | | |
|---|---|---|---|
| 3,994,802 | 11/1976 | Casey et al. | 210/903 X |
| 4,011,156 | 3/1977 | Dubach et al. | 210/630 X |
| 4,173,531 | 11/1979 | Matsch et al. | 210/624 |
| 4,370,234 | 1/1983 | Marsland | 210/903 X |
| 4,537,682 | 8/1985 | Wong-Chong | 210/903 X |
| 4,552,663 | 11/1985 | Spector et al. | 210/903 X |

Primary Examiner—Tom Wyse
Attorney, Agent, or Firm—Browdy and Neimark

[57] ABSTRACT

The ammonia concentration present in waste water is reduced by treating the waste water with a suspended growth microbial system such as an activated sludge containing organisms of the genus Nitrosomonas and organisms of the genus Nitrobacter, but in which the microbial activity of Nitrobacter is effectively inhibited. The process includes a step of treating the microbial system under conditions effecting inhibition of the Nitrobacter but substantially unaffecting the growth and metabolic characteristics of the Nitrosomonas, and subjecting the ammonia containing waste water to the so treated microbial system for a hydraulic retention time which is less than the recovery time of the inhibited Nitrobacter. As a result, the retrograde step of nitrite-nitrate conversion in the overall denitrification process also is reduced or eliminated, with consequent energy and cost savings.

9 Claims, 1 Drawing Figure

NITRIFICATION PROCESS IN WASTE WATER TREATMENT

This application is a continuation of application Ser. No. 724,649, filed Apr. 18, 1985. now abandoned.

FIELD OF THE INVENTION

This invention relates to waste water treatment, and more particularly to processes for treating waste water to remove excess ammonia biologically therefrom.

BACKGROUND OF THE INVENTION

The waste water effluent from many industrial facilities, such as steel plants and fertilizer manufacturing plants, contains excessive amounts of ammonia, derived in some cases from the hydrolysis of urea. The ammonia concentration must be reduced to acceptable levels before the waste water is discharged into the aquatic environment, since ammonia exerts a considerable oxygen demand on the receiving water, it is toxic to some forms of aquatic life, and plays a role in eutrophication of water bodies.

BRIEF REFERENCE OF THE PRIOR ART

Conventionally reduction of ammonia concentration is accomplished by the activated sludge process, in which the ammonia contained in the waste water is oxidised by appropriate microbial action to the nitrate ion. This process is commonly referred to as nitrification. Further removal of nitrogen from this waste water is accomplished by denitrification where nitrate ions are reduced to elemental nitrogen.

In a typical conventional process, the ammonia containing waste water is treated with bacteria under aerobic conditions in an aeration tank. Among the active microorganisms are Nitrosomonas and Nitrobacter, both of which abound in nature and which grow efficiently under the conditions encountered in such waste water treatment. The ammonia is oxidised to nitrite ion and then to nitrate ion, which is then, in a separate stage, reduced to nitrite and to nitrogen anaerobically using an appropriate source of organic carbon (commonly methanol) and appropriate microorganisms.

The action of the Nitrosomonas in the aeration tank is in fact the production of nitrite ion from ammonia, whereas an action of the Nitrobacter is to oxidize nitrite ion to nitrate. Since any nitrate produced in the first stage must be reduced to nitrite again in the second stage before being converted into nitrogen therefrom, this nitrate formation by action of Nitrobacter on nitrite ion is a retrograde step. Because of its abundance in the natural environment and its nature, it is not practical to attempt to eliminate Nitrobacter from the contents of the aeration tank.

The overall reaction for microbiological removal of ammonia in waste water treatment can be represented as follows:

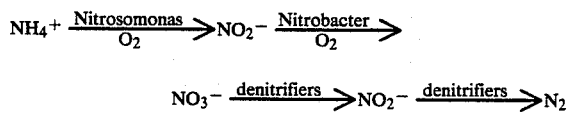

SUMMARY OF THE INVENTION

The present invention has as an objective the reduction or elimination of the nitrite-nitrate oxidation step in the above process, so as to improve the overall efficiency of the biological nitrogen removal.

According to the present invention, therefore, there is provided a microbiological process for treating ammonia-containing waste water to convert at least a part of the ammonia content thereof to nitrite ion, which comprises subjecting the ammonia containing waste water under aerobic conditions to the action of microbes of the genus Nitrosomonas under condition favourable to Nitrosomonas growth and action and in the presence of microbes of the genus Nitrobacter in an inhibited state, the residence time of the waste water under such conditions being shorter than that required to overcome the inhibited state of the Nitrobacter.

In a more specific aspect, the present invention provides a process in which an ammonia containing inflow waste water stream is treated in a first aeration treatment zone with microorganisms including Nitrosomonas and Nitrobacter under aerobic conditions, and promoting the activity of Nitrosomonas, but wherein the Nitrobacter is in a growth inhibited condition. The microbial sludge separated from at least the major portion of the waste water so treated, is fed to and retained in an inhibition zone where it is subjected to conditions of pH and free ammonia concentration which inhibit the activity of Nitrobacter whilst leaving the activity of Nitrosomonas substantially unaffected. The thus treated sludge is then recycled from the inhibition zone to the first aeration treatment zone to be mixed therein with the influent waste water stream. The residence time of the mixed liquor in the aeration treatment zone (the hydraulic retention time) is adjusted so as to be insufficient to allow substantial re-establishment of the activity of the Nitrobacter organism therein, i.e. it is less than the recovery time of the inhibited Nitrobacter organism.

In the overall process set out above, it can be seen that the action of Nitrobacter organism is a redundant step, producing nitrate from nitrite, which must subsequently be returned to nitrite. By elimination, at least in part, of that particular step, cost reductions and energy savings in the process can be realized.

The preferred method of conducting the process of the present invention is by treatment of the microbial culture system (normally activated sludge) separately from the bulk of the waste water to be treated in the aeration treatment zone, to cause inhibition or substantial inactivation of the Nitrobacter therein whilst leaving the Nitrosomonas substantially unaffected. This is conveniently accomplished in the recycle line associated with a continuous process and in a separate chamber in a semi-continuous process. Thus the treated waste water and suspended activated sludge (mixed liquor) therein may be fed continuously to a settling vessel, in which the sludge settles downwardly, and from there the sludge may be fed to an inhibition zone or vessel in which it is treated to inhibit the Nitrobacter, and then recycled to the aeration treatment zone to mix with the fresh incoming waste water. The treatment effected in the inhibition zone is sufficient that, in combination with the chosen residence time in the aeration tank, the Nitrobacter does not substantially re-establish itself as a fully active, microorganism in the aeration tank. In other words, the conditions of inhibition and residence time are preferably adjusted so that the residence time in the aerobic treatment zone (the hydraulic retention time) is shorter than the recovery time of the inhibited Nitrobacter. In this preferred process, transformation of nitrite to nitrate is suppressed and under steady state conditions nitrate is not present in the effluent to any significant extent. When this effluent is passed on to the denitrification stage, nitrite will be transformed to nitrogen gas by the normal denitrifying organisms.

Thus the process according to the present invention, as compared with standard processes of the prior art, has the advantage of lower oxygen requirements and hence reduction of the energy requirements of the operating plant as a whole. The efficiency of the process is enhanced, and reduced reactor volumes can be employed. The carbon requirements for the denitrification process are reduced, and there is an overall cost reduction for the removal of nitrogen from waste water.

BRIEF REFERENCE TO THE DRAWING

FIG. 1 is a diagrammatic process flow sheet illustrating the operation of a preferred process of the invention in a continuous mode.

SPECIFIC DESCRIPTION OF THE MOST PREFERRED EMBODIMENT

With reference to FIG. 1 of the accompanying drawings, ammonia-containing waste water for treatment according to the invention is fed via inflow line 10 to an aeration tank 12 constituting an aerobic treatment zone, and in which it is mixed with activated sludge containing appropriate microorganisms for waste water treatment. In tank 12, aerobic microbiological activity of the microorganisms of the activated sludge take place, to treat and convert the impurities in the waste water. The activated sludge contains the common, naturally occurring and widespread microorganisms of the genus Nitrosomonas and Nitrobacter, among others. The Nitrobacter organisms in the activated sludge are however in a condition of inhibited growth, as a result of recycle treatment as described below, whilst the Nitrosomonas organisms are in condition for growth and oxidation of $NH_3$, and the conditions in the tank 12 are such as to promote Nitrosomonas growth and replication. Accordingly, the predominant reaction in the aeration tank as regards ammonia treatment is conversion of ammonia to nitrite ion, thus:

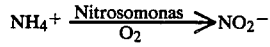

$$NH_4^+ \xrightarrow[O_2]{\text{Nitrosomonas}} NO_2^-$$

the possible further reaction to form nitrate under the action of Nitrobacter is inhibited. After a suitable residence time in aeration tank 12, which is insufficient for the recovery and re-establishment of the growth of the Nitrobacter organisms to any great extent, as discussed below, the treated waste water is fed via outflow line 14 to a settling vessel 16, in which the activated sludge content of the treated waste water is allowed to settle downwardly. The major portion of the treated waste water proceeds from the upper part settling vessel 16 via exit line 18 to further treatment stations, e.g. for microbial treatment to form elemental nitrogen from the nitrite ion therein.

A minor portion of the treated waste water, along with the activated sludge content thereof, proceeds from the bottom of settling tank 16 through a recycle line 20 to an inhibition chamber 22 constituting an inhibitor treatment zone. In chamber 22, adjustments are made to the recycled portion of the waste water to ensure inhibition of the growth of Nitrobacter microorganisms on the waste water substrate. Then the portion is returned via line 24 to aeration tank 12 in which it is mixed with fresh incoming waste water from line 10. Accordingly, upon its re-entry into vessel 12, the activated sludge contains inactivated Nitrobacter but fully active Nitrosomonas. There is also included an outflow line 26, through which activated sludge may be removed for the control of the system.

Upon mixing with the incoming waste water feed from line 10, the inhibitory conditions on the Nitrobacter in the sludge will naturally change, so that gradually Nitrobacter will tend to become re-established, to grow and replicate in aeration tank 12. Accordingly, the residence time of the waste water treatment in tank 12 is adjusted, in combination with the inhibition inflicted on the Nitrobacter in the inhibition chamber 22, to limit severely the extent to which the Nitrobacter becomes re-established in tank 12. By suitable such control on the residence time, it can be arranged that the activated sludge is recycled through the Nitrobacter inhibition process continuously and frequently enough so that its activity in aeration tank 12 in converting nitrite to nitrate becomes negligible.

Inhibition of Nitrobacter as referred to herein is a temporary suppression of the activity of the organism as opposed to the killing of the organism or the destruction of its metabolic activity under conditions of toxicity. Inhibition of Nitrobacter can be achieved under adverse conditions of physical parameters such as pH, temperature etc. High concentrations of Free Ammonia ($NH_3$) and materials (organic and inorganic) inhibitory to the Nitrobacter organisms also can cause inhibition. Thus an alternative procedure for inhibition of Nitrobacter according to the present invention is addition of appropriate inhibitory chemicals to the sludge, in the inhibitor zone. Examples of such inhibitory chemicals include potassium chlorate, quinacrine, diphenylthiocarbazone, nitrourea, etc.—see Hockenbury et al, Journal WPCF, "Inhibition of Nitrification—effects of selected organic compounds" May 1977, p768-777 esp. Table 1 thereof, at p.769. Use of such compounds is however less preferred in the process of the present invention, since the added chemicals might themselves constitute pollutants and provide problems of removal thereof.

The conditions of adjustment made in inhibition chamber 22 are essentially a combination of the pH value and free ammonia concentration. Thus appropriate additions of acid or alkali are added to the contents of inhibition chamber 22 to bring the pH thereof into the range 7.8 to 9.2, and preferably into the range 8.4 to 8.8. Growth of Nitrobacter is also inhibited by presence of relatively large concentrations of free ammonia, for example in the range 0.1 mg/L to 5.0 mg/L. Thus appropriate ammonia addition is made to the contents of inhibition chamber 22 to bring the free ammonia concentration therein to the range 0.5 mg/L to 3 mg/L, preferably 1 mg/L to 4 mg/L. Inhibition of Nitrobacter occurs most efficiently at the high end of the pH range specified above, and at the high end of the specified range of free ammonia concentration. Then, activated sludge effectively containing "dormant" Nitrobacter returns to aeration chamber 12. The residence time therein should not exceed 10 hrs, and preferably should not exceed 6 hrs, to prevent substantial re-establishment of the Nitrobacter activity. The greater degree to which inhibition of the Nitrobacter has been effected in inhibition chamber 22, the closer the upper limit of the above specified residence time can be approached.

The process of the invention can of course be operated on a batch mode if desired (e.g. a sequential batch reactor system - SBR). In such a case, the activated sludge is pretreated to cause inhibition of the Nitrobacter, then introduced along with the waste water to be treated into an aerobic treatment zone. Treatment predominantly by the active Nitrosomonas organisms therein, to convert ammonia to nitrite ion, is conducted for a predetermined time calculated to be insufficient to allow substantial re-establishment of the Nitrobacter in activated condition. Then the sludge is allowed to settle out, removed and subjected to further inhibition treatment, whilst the majority of the treated waste water is moved on to another treatment stage for denitrification. After suitable inhibition treatment of the microorganism mixture, the process can be repeated on a further batch of ammonia containing waste water.

The process of the invention is further illustrated by means of the following specific examples.

EXAMPLES

Experiments were conducted to measure the inhibitory effects of free ammonia concentration (FA) and the pH condition on Nitrobacter organisms.

The biomass used in the experiments was obtained from a nitrifying activated sludge plant at Milton, Ontario, and was maintained in a stock culture for further enrichment of nitrifying organisms. Experiments were conducted initially in semi batch reactors, under controlled pH conditions at room temperature, to establish inhibition condition. Free ammonia concentration was adjusted by addition of ammonium chloride solution. To maintain a constant FA concentration, the ammonium chloride solution was fed in at a rate equal to the predetermined rate of oxidation of ammonia by Nitrosomonas.

The pH in the reactors was controlled automatically by a multi-channel controller by dosing an alkaline solution in the following composition: 25 grams sodium bicarbonate, 10 grams sodium carbonate and 25 grams sodium hydroxide per liter of solution.

The dissolved oxygen concentration in the reactors was always between 6 and 8 milligrams per liter. The total ammonia concentration was determined using an ion selective electrode, whilst nitrite and nitrate ions were analysed on auto analyzer with sulfanilamide and a cadmium reduction column. The FA concentration was obtained from the chart given by Anthonisen et al, "Inhibition of Nitrification by Ammonia and Nitrous Acid", *JWPCF*, Vol. 48, p. 835, 1974, from the total ammonia concentration and the pH. The degree of inhibition is indicated by the ratio between the accumulating nitrite concentration to the combined nitrite and nitrate concentrations.

The Table below shows the results obtained in preliminary experiments run on a continuous mode operation. The influent ammonium nitrogen concentration ($NH_4^+ - N$) was 50 mg/L, and pH in the aeration tank was approximately 7.5.

TABLE

| Experiment No. | Inhibition Chamber Conditions pH | Inhibition Chamber Conditions FA mg/L | HRT in aeration tank (hrs) | Effluent composition, mg/L $NH_4^+$—N | $NO_2^-$—N | $NO_3^-$—N |
|---|---|---|---|---|---|---|
| 1 | 8.8 | c 1.0 | 3.0 | 10 | 16 | 22 |
| 2 | 8.8 | c 2.0 | 3.5 | 8 | 29 | 10 |
| 3 | 8.8 | c 3.0 | 4.0 | 6 | 32 | 10 |
| 4 | 8.8 | c 4.0 | 4.0 | 6 | 38 | 4 |
| 5 | 8.6 | 1.0 | 3.0 | 6 | 15 | 28 |
| 6 | 8.6 | 2.0 | 3.5 | 8 | 24 | 15 |
| 7 | 8.6 | 3.0 | 4.0 | 5 | 30 | 12 |
| 8 | 8.8 | 4.0 | 4.0 | 7 | 36 | 4 |

We claim:

1. A microbiological process for treating ammonia-containing waste water to reduce the ammonia concentration thereof, which comprises:

feeding said waste water to aerobic treatment zone which contains an active microorganism system containing microorganisms of the genus Nitrosomonas in an active growth condition and microorganisms of the genus Nitrobacter in an inhibited condition;

subjecting waste water in said aerobic treatment zone to the microbiological action of Nitrosomonas organisms and for a time which is less than that required for rehabilitation of said Nitrobacter to fully active condition therein;

transferring said microorganism system to an inhibition zone;

treating the microorganism system by a treatment selected from pH adjustment, free ammonia concentration adjustment and addition of inhibition-causing chemicals in the inhibition zone to inhibit the growth of Nitrobacter on said waste water substrate whilst leaving the activity of Nitrosomonas therein substantially unaffected;

and returning the microorganism system so treated to the aerobic zone to mix with waste water therein.

2. The process of claim 1 wherein said active microorganism system is a sludge.

3. The process of claim 2 wherein the time of waste water treatment in said aerobic treatment zone is not greater than about 6 hrs.

4. The process of claim 3 wherein the said time is from about 3 to 6 hrs.

5. The process of claim 2 conducted on a continuous basis.

6. The process of claim 2 conducted in a sequential batch reactor system.

7. The process of claim 1 wherein said treatment comprises and adjustment of pH to a value in the approximate range 7.8 to 9.2.

8. The process of claim 1 wherein the free ammonia concentration is adjusted to a value in the approximate range 1 mg/L to 4 mg/L.

9. A microbiological process for treating ammonia-containing waste waster to reduce the ammonia concentration thereof, which comprises:

feeding said waste water to an aerobic treatment zone which contains an active microorganism system containing microorganisms of the genus Nitrosomonas in an active growth condition and microorganisms of the genus Nitrobacter in an inhibited condition;

subjecting waste water in said aerobic treatment zone to the microbiological action of Nitrosomonas organisms;
periodically after time intervals less than the time required for rehabilitation of the Nitrobacter to active condition exposing said microorganism system to a separate inhibition zone;
treating the microorganism system in the inhibition zone by a step selected from pH adjustment, free ammonia concentration adjustment and addition of inhibition-causing chemicals to inhibit the growth of Nitrobacter on said waste water substrate whilst leaving the activity of Nitrosomonas therein substantially unaffected;
and returning the microorganism system so treated to the aerobic zone to mix with waste water therein.

* * * * *